United States Patent Office 3,567,503
Patented Mar. 2, 1971

3,567,503
PAPER TREATED WITH COPOLYMER
COMPOSITIONS
William Franklin Fallwell, St. Louis, Mo., assignor to
Monsanto Company, St. Louis, Mo.
No Drawing. Continuation-in-part of application Ser. No.
703,250, Feb. 6, 1968, which is a division of application
Ser. No. 411,610, now Patent No. 3,395,131, dated Nov.
16, 1964. This application Sept. 30, 1969, Ser. No.
862,533
Int. Cl. D21h 1/28
U.S. Cl. 117—155    5 Claims

ABSTRACT OF THE DISCLOSURE

This invention relates to copolymers of a vinyl compound and a partial ester of an unsaturated dibasic acid anhydride and a hydroxyl-contining nonionic dispersing agent and their use as pigment binders in mineral coated paper.

---

This application is a continuation-in-part of application Serial No. 703,250, filed Feb. 6, 1968 and now abandoned which is a division of pending application Serial Number 411,610, filed Nov. 16, 1964, now U.S. Patent 3,395,131.

This invention relates to the emulsion copolymerization of vinyl monomers with polybasic unsaturated carboxylic acid partial esters, and to the use of the resulting copolymers as modifiers for cellulosic materials. More particularly, this invention provides new so-called emulsion copolymers of vinyl type monomers and partial esters of polybasic unsaturated carboxylic acids by a simpler method than was previously used and cellulosic products coated with these new copolymers to improve liquid barrier properties, grease resistance, and also provides mineral pigment coating compositions containing the copolymers of this invention as an adhesive binder to improve the resistance of the mineral pigment coated paper to the pull of printing ink in the printing operation.

Briefly, this invention provides new copolymers of vinyl-type monomers and partial esters derived from unsaturated polybasic carboxylic acid and hydroxyl containing non-ionic dispersing agents, and cellulosic materials coated with these copolymers to enhance the properties thereof.

The copolymers of this invention contain from about 5 to about 25 parts by weight of partial ester per 100 parts by weight of vinyl type monomer. This invention thus provides a method for preparing vinyl-type copolymers by emulsion type polymerization procedure which permits the use of fewer reagents or reactants in the polymerization recipe while providing for the "built in" dispersancy required for making fine quality, small particle size copolymers which features are desirable for use of the copolymers in the conventional paper treating equipment of the paper coater.

It is within the scope of this invention to prepare copolymers of this invention by copolymerizing any vinyl type monomer, i.e., a polymerizable compound having the group

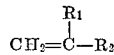

where $R_1$ is hydrogen, methyl, (or halogen such as chlorine or bromine) and the indicated free valence is the residue of a monomer polymerizable with any partial ester of a polymerizable, unsaturated polybasic carboxylic acid anhydride with any of the many known hydroxyl group-containing non-ionic dispersing agents. However, as a practical matter, copolymers of more economic importance and the simplest ones to prepare are those copolymers which are reaction products of (1) a compound of the formula

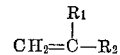

where $R_1$ is either hydrogen or methyl and is methyl only when $R_2$ contains a carbonyl carbon atom, i.e., a —C(O)—, directly bonded to the carbon atom to which $R_1$ is bonded, and $R_2$ is any of the following groups:
  —C(O)OR$_3$ where $R_3$ is any alkyl radical having from 1 to about 8 carbon atoms, preferably from 1 to 4 carbon atoms,
  —OC(O)R$_4'$ where $R_4$ is an alkyl radical having from 1 to about 4 carbon atoms, —CN, —Cl and —Br, and (2) a partial ester, preferably the half ester, of (i) an alpha-beta-unsaturated dibasic carboxylic acid having as a general formula either

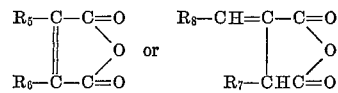

wherein each of $R_5$, $R_6$, and $R_7$ is selected from the group consisting of hydrogen and lower alkyl groups having from 1 to 2 carbon atoms, and $R_8$ is either hydrogen or a carboxyl group and (ii) a hydroxyl containing non-ionic dispersing agent which is generally a composition mixture conforming in general to the formula

wherein $R_9$ is any hydrophobic group, e.g., alkyl having from 8 to about 25 carbons or more, or an alkyl-substituted phenyl radical having a total of from about 8 to 25 carbon atoms or more in the alkyl groups and preferably has at least one alkyl group containing at least about 8 carbon atoms, and $n$ is an average number of from about 6 to about 60 or more denoting the average number of ethyleneoxy groups in the non-ionic dispersing agent compositions (ii) used to prepare the partial ester reactant (2).

The term "vinyl-type" monomer that is used in describing component (1) of the copolymers of this invention is a general term of convenience to include any of the polymerizable compounds having a group of the above-described structure. It includes reactive monomers wherein the olefinic double bond group is in the acid moiety of an ester such as methyl acrylate, ethyl acrylate, methyl methacrylate, propyl acrylate, butyl acrylate, hexyl methacrylate, 2-ethylhexyl acrylate, although acrylate esters having over 4 carbon atoms in the alcohol moiety of the ester are preferably used only in small amounts, say 10% or less in conjunction with a more reactive smaller vinyl monomer in the alcohol moiety of an ester such as vinyl formate, vinyl acetate, vinyl butanoate, in hydrocarbons containing an activating group such as styrene, methyl-substituted styrenes, such as vinyl toluene in nitriles such as acrylonitrile and vinyl halide monomers such as vinyl chloride and vinyl bromide. The "vinyl-type" monomer or mixtures thereof may also contain small amounts say, less than 5 percent of the total monomer charge of an ammonium or alkali metal acrylate or methacrylate such as ammonium acrylate, sodium and potassium methacrylate.

Examples of partial ester reactants (2) which may be used include the half esters derived by reacting a suitable polybasic acid anhydride (i) such as maleic anhydride, itaconic anhydride, aconitic anhydride, citraconic anhydride, with an equimolar amount of the desired hydroxyl-containing non-ionic dispersing agents are known and could be used to form the partial ester reactant and the copolymers of this invention. However, the preferred nonionic dispersing agents are those of the above formula having a molecular weight of at least about 300, and preferably for about 400 to about 900. Lower molecular weight non-ionic dispersing agents could be used but the esters of such lower molecular weight esters provide acid levels (from the free carboxylic acid remaining about 5% of the total charge. If the acid level is too high the rate of copolymerization reaction with the "vinyl-type" monomer is substantially retarded.

The desired type of non-ionic dispersing agent is economical and serves the purpose of preparing these copolymers and the use of the copolymers on paper very well in terms of both performance and cost. Examples of such materials include alkylphenoxypolyethoxyethanols having alkyl groups of from about 8 to 25 carbon atoms and about 6 to about 60 oxyethylene units such as nonylphenoxypolyethoxyethanols, octylphenoxypolyethoxyethanols, methyloctylphenoxypolyethoxyethanols, dinonylphenoxypolyethoxyethanols, dodecylphenoxypolyethoxyethanols and the like. Analogous ethylene oxide condensates of long chain alcohols or branched chain "oxo"-alcohols such as straight or branched octyl, decyl, dodecyl, tridecyl, hexadecyl alcohols may be used. Other useful hydroxyl-containing non-ionics which can readily be substituted for the above exemplified preferred non-ionics include polyethoxyethanol derivatives of methylene-linked alkyl-phenols.

The partial ester monomer or reactant used in preparing the copolymers of this invention may be conveniently prepared, for example, by mixing the chosen polybasic unsaturated carboxylic acid anhydride and the chosen hydroxyl-containing alkylpolyethoxyethanol, alkylphenylpolyethoxyethanol, or other appropriate hydroxyl-containing non-ionic dispersing agent, preferably in about equimolar proportions, and heating the mixture to a temperature high enough to initiate and maintain reaction until reaction is substantially completed. Temperatures of from about 90° to about 140° C. at atmospheric pressure are usually sufficient for most anhydride-hydroxyl-containing non-ionic dispersing agents combinations, although lower temperatures may suffice for some of the more reactive materials.

The reaction may be said to be completed when the acid number is within about 90% of the theoretical acid number for obtaining the half-ester of the unsaturated acid. The acid number is the number of milligrams of KOH required to neutralize the acid content of 1 gram of sample to a phenolphthalein end point. The partial ester mixture thus obtained may be used as such in preparing the copolymer of this invention.

In preparing the copolymers of this invention, it is only necessary to combine the vinyl monomer and the partial ester in the proportions desired in the copolymer product, together with the polymerization catalyst and water in amount sufficient to produce moderate reaction with heat and agitation. With some vinyl monomers, such as vinyl chloride it may be advantageous to use elevated pressures, say, up to about 500 p.s.i. or more at 30–50° C. to effect copolymerization in reasonable time periods. Generally, reaction temperatures of from about 70° to about 85° C. with little or no elevated pressure are sufficient but temperatures somewhat lower or higher, say 30° C. to about 90° C. may be used for some combinations of reactants.

A preferred method of combining the various components of the polymerization mixture is to first combine a relatively higher proportion of the half ester with the vinyl monomer, polymerization catalyst or initiator, and water in the reaction vessel and heat and stir the mixture to form polymer "seed" particles. This mixture can be termed the "charge" mixture. To this charge mixture of polymer "seed" in water, an aqueous neutralized solution of the partial ester, the vinyl monomer together with more half ester, the catalyst, and the additional water (termed the delayed water mixture charge) are metered into the stirred or agitated reaction mixture, preferably so that the addition of all of the components will be completed at about the same time, while maintaining the temperature high enough to promote reaction. When the addition of the components is completed, heating is continued until the content of the vinyl monomer is essentially depleted, say, to below about 1%, preferably ½% or less. The copolymer dispersion or latex thus obtained may be used as such. Preferably, however, it is strained through a 100 to 200 mesh screen to remove any coagulum which may have formed, which should be a very small amount by weight based on the weight of the copolymer produced in the given batch. Generally, the amount of such coagulum should amount to no more than about ½% of the emulsion copolymer weight and is generally less than 0.1%.

For the copolymerization, water soluble peroxide free-radical forming catalysts, including catalyst systems of the redox type, are recommended. Catalysts such as the alkali metal persulfates, particularly potassium persulfate, as well as ammonium persulfate, and redox type combination catalyst systems such as potassium persulfate and sodium formaldehyde sulfoxylate or sodium formaldehyde sulfoxylate or sodium bisulfite are preferred. Other peroxide catalysts which could be used include the organic hydroperoxides such as tert-butyl hydroperoxides and cumene hydroperoxide. Activators and promoters in the form of the salts, such as the sulfates or chlorides, of metals which are capable of changing from one valence state to another such as iron, nickel, and copper may also be used in small amounts say, up to a few hundred parts per million of the total reaction mixture. The amount of the peroxide or redox mixed catalyst used in copolymerization systems of this invention may range from about 0.2 to about 1% based on the weight of the total monomer used. Preferred quantities of persulfate range from about 0.1 to 0.6% of catalyst. The catalyst is usually added to the reaction vessel as an aqueous solution. The concentration of the catalyst will depend upon its solubility in water but generally the catalyst solution or dispersion will be from about 5 to 10% by weight of the catalyst in water. It has also been found that the particle size of the copolymer is usually further reduced by including in the reaction mixture a small amount of an anionic emulsifying or surface active agent or surfactant. Generally, the amounts of anionic surfactants used in such cases range up to about 5 percent by weight, based on the weight of the total monomer charged. Examples of anionic dispersing agents which could be used for this purpose are given below.

The copolymer dispersion or latex in water is preferably used soon after it is prepared. For any extended shipping or storage periods, however, the copolymer dispersion may be stabilized by adding to the aqueous copolymer dispersion any well known polymer stabilization agent such as polyvinyl alcohol, hydroxy-ethyl cellulose, and anionic emulsifying agents such as higher fatty alcohol sulfates, e.g., sodium lauryl sulfate, the alkylarylsulfonates such as alkali metal salts of the alkylarylsulfonates such as sodium octylphenylsulfonate, potassium dinonylphenylsulfonate, and sodium dioctyl sulfosuccinates, etc.

The copolymer dispersion or latex may be applied directly to one or both sides of paper surfaces by known application methods to impart improved barrier properties to the treated paper but is particularly useful as a pigment binder and as such is mixed with the pigment prior to application to the paper. The pigment or pigments are preferably mixed and dispersed in a small amount of water before mixing with the copolymer dispersion. When clay is used as a part of the pigment, and in preferred applications it forms a predominant proportion if not the only pigment, the clay dispersion is adjusted to a basic pH to obtain the optimum dispersion of the clay.

Pigments which may be employed include clays, especially the kaolin type, calcium carbonate, blanc fixe, talc, titanium dioxide, color lakes and toners, ochre, carbon black, graphite, aluminum powder or flakes, chrome yellow, molybdate orange, toluidine red, copper phthalocyanines, such as the "Monastral" blue and green lakes. The term "mineral" as used herein is intended to define all such types of pigmentary matter whether of strictly mineral character, synthesized chemical pigments, or partly of organic material.

The amount of the adhesive or binder in a coating composition for paper applications generally runs from about 5 parts to about 30 parts by weight of the binder for every 100 parts of the pigment, and preferably from about 10 parts to about 20 parts by weight thereof. The copolymer dispersions of this invention may constitute the entire binder of the coating composition, but the copolymers may be combined with other binders to improve the effectiveness thereof, such as the known types of starches, and starch derivatives referred to herein generally as starch products, e.g., dextrins, hydroxyethylated starches, British gums, etc. and proteinaceous materials such as casein, soybean extract, etc. referred to herein as proteins. The amount of copolymer in the binder composition will depend upon the degree of improvement in brightness, gloss ink holdout, coating gloss, etc. desired. Generally from about 0.05 to about 100 parts by weight of copolymer are employed per 1 part by weight of the other binder material.

After combining the pigment and the copolymer dispersion containing binder, the resulting composition can be applied to the paper, paper board, or paper product at a total solids concentration of at least about 40% solids and preferably 50% to 75% by any suitable equipment such as immersion roll or doctor systems, gravure roller system, brush coater, or spray coater. It may be applied to the paper after drying and/or conditioning in an "off-machine" secondary operation converter or it may be applied during the drying operation on the paper making machine where it has undergone only partial drying.

After the coating operation the coated sheet is dried and may then be calendered, and subsequently printed upon. The drying may be the usual type provided in which air is about 230° F. to 260° F. (110°–130° C.) is directed against the paper for thirty to sixty seconds. The paper and coating may reach a temperature of about 180° C. (ca. 85° C.) during the drying operation. Printing may be affected by the conventional inks of precipitation type or heat setting type including those based on drying oils. The coated products of this invention are receptive to single color inks and multi-color inks of graded viscosity and are able to withstand the pull of such inks. The coated sheet may be overcoated, after printing with wax, lacquer, varnish, or other compositions.

The invention is further illustrated by the following detailed examples.

EXAMPLE 1

A preferred copolymer composition used in accordance with this invention was prepared as follows:

To a reaction vessel there was added a solution: 420 ml. deionized water, 8 g. of branched-chained p-dodecylphenoxynonaethenoxyethyl hydrogen maleate (termed the half ester) and 4 ml. of a 10% aqueous sodium hydroxide solution (2.4 g. of sodium hydroxide in 24 ml. of solution). The solution was heated to 80° C. and 30 ml. of catalyst solution run in, prepared by dissolving 4.5 g. of potassium persulfate in 85 ml. of demineralized water, and making up the volume to 90 ml. When the temperature returned to 80° C. the addition of 25 g. of vinyl acetate was begun, rapid at first, and then throttled to maintain batch temperature from 77°–79° C. with moderate reflux. The resulting mixture contained the "seed" copolymer. The temperature was controlled by the speed to the vinyl acetate addition. After the "seed" vinyl acetate was in the mixture and the temperature was steady at about 80° C., there was begun the continuous addition of 270 ml. "Delayed Water Solution" containing 40 g. of the half ester in 200 ml. of water and 20 ml. of the 10% sodium hydroxide solution, with water added thereafter to bring the volume to 270 ml., and the "Monomer Blend" containing 695 g. of vinyl acetate and 32 g. of the half ester (approximately 779 ml.). Catalyst solution was added at a steady rate of about 0.2 ml. per minute. The rates of addition of the "Delayed Water Solution" and the "Monomer Blend" were controlled so that the addition of the reaction mixture would be completed at the same time. The temperature of the mixture was maintained at 79°–81° C. for about five hours from the start of the continuous addition of the "Delayed Water Solution" and "Monomer Blend." When the additions were completed the mixture was held at 80° C. with moderate agitation until the vinyl acetate content reached 0.5% or lower. The resulting copolymer latex was a copolymer containing about 90% by weight of vinyl acetate and 10% by weight of the p-dodecylphenoxynonaethenoxyethyl hydrogen maleate half ester. The batch was cooled to 25° C. and filtered through a 100 mesh stainless steel screen.

EXAMPLE 2

A standard pigment composition consisting of 90% by weight of clay (kaolin) and 10% of titanium dioxide was dispersed in water to a 70% total solids content using a high mechanical shear apparatus with the aid of one-quarter percent by weight based on the weight of the dry pigment of a tetrasodium pyrophosphate dispersing agent. To this dispersion there was added the copolymer dispersion of latex, the solids content of which ranged from about 30% to 50% polymer solids depending upon the copolymer used in the ratio of about 25 parts by weight of polymer solids to 100 parts by weight of the pigment solids.

In the I.G.T. test a tack graded ink is applied uniformly to a standard diameter wheel. A strip of paper or paper board containing the test coating thereon is fastened to a spring loaded cylindrical segment of known diameter. The ink-laden wheel is placed against one end of the strip of paper or paper board at a known constant pressure. The cylinder spring is released and as the cylinder passes through a given arc tacky ink is applied to the strip at velocity increasing from 0 to about 630 ft. per second. If the coating fails ("picks") a break in the coating will be apparent at some point on the strip. The first point of such consistent failure is measured and reported as the velocity (ft./min.) and ink tack number withstood by the coating before failure. This test is run on mineral pigment coated paper with inks of increasing tack numerically, designated in ascending increments until failure occurs.

This test procedure was used on a mineral pigment coated label paper as described above using the vinyl acetate/p - dodecylphenoxynonaethenoxyethyl hydrogen maleate copolymer latex, produced as described in Example 1. The paper board was Cylinder Board and Fourdrinier bleached Sulfate Board stock. The paper board was coated with the mineral pigment coating composition at 50% total solids using a No. 12 wire wound rod. About 3 pounds of the coating composition per 1000 sp. ft. of the board was thus applied to one surface. The coated board was dried in an open infra-red oven at 125° C. 1 minute and super calendered at 55PC. and pressure of 2,500 lbs./lineal inch. The coated board had a smooth surface highly receptive to ink and an I.G.T. pick resistance as follows.

| Board | Coating | Velocity at failure, ft./sec. |
|---|---|---|
| Ink No.: | | |
| 2 Cylinder | VA/p-DPHM [1] | 620 |
| 2 Sulfate | VA/p-DPHM [1] | 630 |
| 3 Cylinder | VA/p-DPHM [1] | 570 |
| 3 Sulfate | VA/p-DPHM [1] | 630 |
| 2 Cylinder | PVA [2] | 630 |
| 3 Sulfate | PVA [2] | 630 |

[1] VA/p-DPHM is the vinyl acetate/p-dodecylnonaethoxyethyl hydrogen maleate copolymer binding agent of Example 1.
[2] PVA is a commercial polyvinyl acetate homopolymer.

EXAMPLE 3

Cylinder board coated with a mineral pigment composition as described in Example 2 was tested to determine the coating gloss. The gloss of a coating is determined by measuring the light reflectance (75° angle) before and after calendering the coated paper. The gloss reading instrument is set at 100% reflectance with a Corrara gloss standard. By such test the cylinder board coated with a mineral pigment coating composition containing the copolymer of Example 1 as the adhesive binder was rated 29 whereas a similar cylinder paper board coated with a similar mineral pigment coating composition containing polyvinyl acetate as the binder was rated 27.

EXAMPLE 4

Cylinder board stock coated with a mineral pigment composition as described above containing the copolymer of Example 1 as the mineral pigment binder was tested for gloss ink holdout. The gloss ink holdout test measures the time ability of the coating to holdout a glossy ink or varnish on the surface. A standard ink is applied to the coated specimen via a proff press or hand brayer. The reflectance of the ink (75° angle of indicence) is measured at known time intervals. Therefor, the higher the reflectance at a given aging period, the better the gloss ink holdout.

According to this test, cylinder paper board coated with the mineral pigment composition containing the copolymer latex of Example 1 as the binder therein reflected 76 percent of the light. A similar cylinder board coated with a mineral pigment coating composition containing a commercial polyvinyl acetate latex as the binder reflected 73% of the light.

EXAMPLE 5

The wet rub resistance of cylinder board coated with a mineral pigment coating composition containing the copolymer latex of Example 1 as the pigment binder was tested according to the finger test. In this test five drops of distilled water are placed on the edge of a coated sheet. A finger is wiped through the water onto a black paper sheet eight (8) times, shifting the black paper after each wipe. The test result is the number of wipes needed (first number) to deposit a white pigment residue on the black surface. The second number indicates the degree of rub off with "5" being the most wet rub resistant. By this test the mineral pigment coated cylinder paper board prepared as described in Example 2 was rated 8+(5) which is the best rating obtainable by this test indicating a high degree of wet rub resistance in the coating composition.

EXAMPLE 6

Cylinder paper board coated with a mineral pigment coating composition containing the copolymer latex of Example 1 as the pigment binder was tested for brightness reflectance according to the following procedure. A perpendicular light source was directed toward a calcium carbonate block rated 100% blue white reflectance. The reflectance percentage of the coated paper is then read when the light scounce search unit is placed on the surface of the paper test specimen. By this test procedure, cylinder board coated with a mineral pigment coating composition containing the copolymer latex as the pigment binder had a brightness rating of 78. A similar coated cylinder board containing a commercial polyvinyl acetate latex as the pigment binder had a brightness rating of 76. Coated sulfate paper board containing the same pigment coating composition and the copolymer latex of Example 1 as the pigment binder had a brightness of 85. The coated sulfate board containing the polyvinyl acetate latex as the pigment binder had a rating of 84.

While this invention has been described with respect to certain embodiments, it is not so limited and it is to be understood that variations and modifications thereof may be made without departing from the spirit or scope of this invention.

The embodiments of this invention in which a particular property or privilege is claimed are defined as follows:

1. Cellulosic paper having a coating thereon comprising
   (I) a finely divided mineral pigment material, and
   (II) a binder comprising
      (A) a copolymer of
         (1) a compound of the formula $$CH_2=\overset{R_1}{\underset{|}{C}}-R_2$$

and
         (2) a partial ester derived from
            (i) an unsaturated dibasic acid anhydride, and
            (ii) a hydroxyl-containing non-ionic dispersing agent, and
      (B) a material selected from the group consisting of starch products and proteins where (II) is present in an amount from about 5 to about 30 parts by weight per 100 parts by weight of (I), (2) is present in an amount from about 5 to about 25 parts by weight per 100 parts by weight of (1), and (A) is present in an amount from about 0.05 part to about 100 parts by weight per one part by weight of (B), and wherein $R_1$ is selected from the group consisting of hydrogen and methyl and is methyl only when $R_2$ contains a carbonyl carbon atom directly bonded to the carbon atom to which $R_1$ is bonded, and $R_2$ is selected from the group consisting of —C(O)OR$_3$ where $R_3$ is an alkyl radical having from 1 to about 8 carbon atoms, —OC(O)OR$_4$ where $R_4$ is an alkyl radical having from 1 to about 4 carbon atoms, —CN, —Cl, and —Br; and in the partial ester (2) the unsaturated acid anhydride (i) has a formula selected from the group consisting of

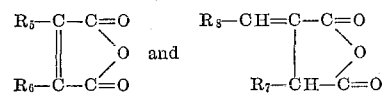

wherein $R_5$, $R_6$, and $R_7$ are each selected from the group consisting of hydrogen and methyl, and $R_8$ is selected from the group consisting of hydrogen and a carboxy group, and the hydroxyl-containing non-ionic dispersing agent (ii) has the formula

wherein $R_9$ is selected fro mthe group consisting of alkyl radicals having from 8 to 25 carbon atoms, and alkyl-substituted phenyl radicals having a total of 8 to about 25 carbon atoms in the alkyl substituents and at least 8 carbon atoms in at least one such alkyl radical, and $n$ is an average number from about 6 to about 60.

2. Cellulosic paper product of claim 1 wherein the mineral pigment material (I) is a mixture of clay and titanium dioxide and in the copolymer of the binder (II), in copolymer component (1) $R_1$ is hydrogen and $R_2$ is —OC(O)R$_4$ where $R_4$ is an alkyl radical having from 1 to 4 carbon atoms, and in copolymer component (2) the partial ester is derived from an unsaturated acid anhydride (i) having a formula containing $R_5$ and $R_6$, and $R_5$ and $R_6$ are each hydrogen, and a hydroxyl-containing compound (ii) wherein $R_9$ is an alkyl-substituted phenyl having a total of 8 to about 25 carbon atoms in the alkyl groups and at least 8 carbon atoms in at least one such alkyl, and $n$ is an average number from about 8 to 12.

3. Cellulosic paper product of claim 2 wherein (1) is vinyl acetate and (2) is p-dodecyl-phenoxy (nonaethoxy) ethyl hydrogen maleate.

4. Cellulosic paper product of claim 1 wherein the mineral pigment material (I) is a mixture of clay and titanium dioxide and in the copolymer of the binder (II), in copolymer component (1) $R_1$ is hydrogen, and $R_2$ is —OC(O)R$_4$ where $R_4$ is an alkyl radical having from 1 to 4 carbon atoms, and in copolymer component (2) the partial ester is derived from an unsaturated acid anhydride (i) having the formula containing $R_5$ and $R_6$, and $R_5$ and $R_6$ are each hydrogen, and in the hydroxyl-containing non-ionic dispersing agent (ii) $R_9$ is an alkyl having from about 8 to about 25 carbon atoms, and $n$ is an average number of from about 8 to 12.

5. Cellulosic paper product of claim 4 wherein (1) is vinyl acetate, and (2) is tridecylnonaethoxyethyl hydrogen maleate.

References Cited

UNITED STATES PATENTS

| | | | |
|---|---|---|---|
| 2,443,735 | 6/1948 | Kropa | 260—29.6X |
| 2,843,556 | 7/1958 | Moorman | 260—29.6X |
| 3,001,957 | 9/1961 | Kray et al. | 117—165X |
| 3,028,258 | 4/1962 | Rice | 117—156X |
| 3,030,323 | 4/1962 | Turai | 117—155X |
| 3,207,718 | 9/1965 | Zimmerman et al. | 260—29.6 |
| 3,222,209 | 12/1965 | Brundige et al. | 117—65.2X |
| 3,268,354 | 8/1966 | Hain | 117—65.2X |
| 3,306,866 | 2/1967 | Percival et al. | 260—29.6X |
| 3,316,198 | 4/1967 | Van Gorder et al. | 117—161X |

WILLIAM D. MARTIN, Primary Examiner

M. R. LUSIGNAN, Assistant Examiner

U.S. Cl. X.R.

117—156; 260—17.4, 29.6, 78.5